May 20, 1958     H. M. WHITMAN     2,835,512
BANKING ENVELOPE
Filed May 14, 1952
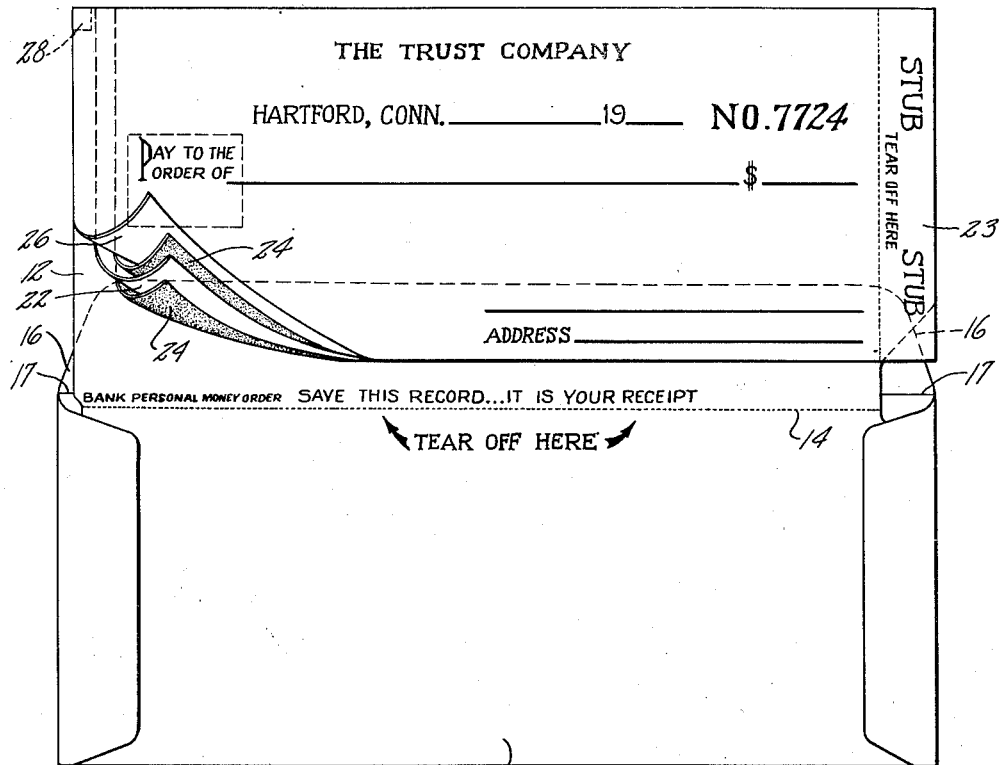
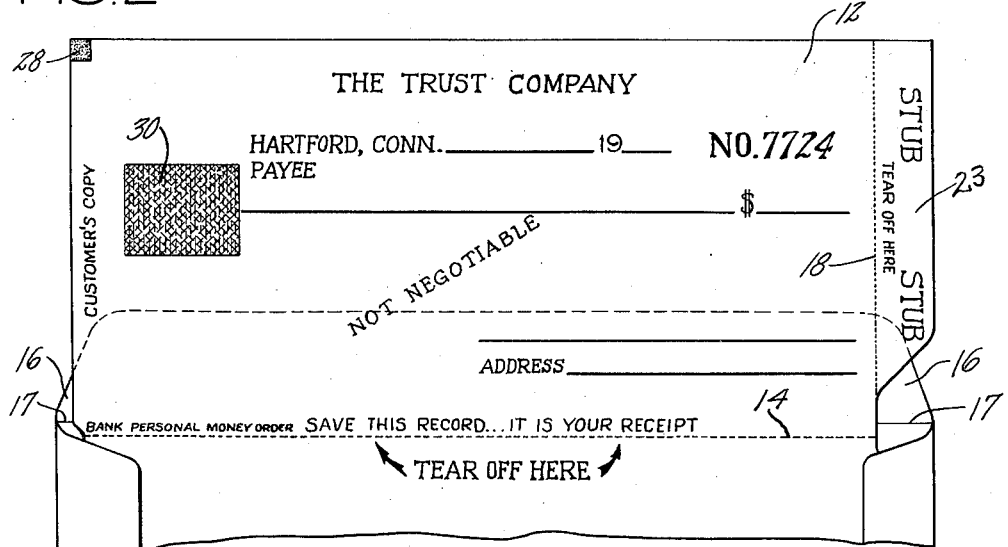
INVENTOR
H. M. WHITMAN
BY Joseph H. Schofield
ATTORNEY

United States Patent Office 2,835,512
Patented May 20, 1958

2,835,512
BANKING ENVELOPE

Harlan M. Whitman, West Hartford, Conn., assignor to Curtis 1000, Incorporated, Hartford, Conn., a corporation of Minnesota Application May 14, 1952, Serial No. 287,691

4 Claims. (Cl. 282—25)

This invention relates to a business or banking correspondence unit comprising an envelope, a check attached thereon and manifold copies of the check; the check and copies thereof being spaced by interleaved carbon papers and preferably attached to an extended panel of the envelope along one of the free edges thereof for ready detachment from the envelope and separation from each other.

A primary object of the present invention is to provide a conveniently usable envelope and attached check that permits a bank to expedite the issuance of a check to a customer and simplify the bookkeeping procedure connected with the transaction. The invention also provides for issuing a receipt to the customer comprising a carbon copy of the details of the check.

In present day banking practice a method of issuing checks to customers on a cash plus fee basis has developed in which for a small fee the bank will issue a check for any small amount. The customer or bank may fill in the name of the payee and the check may be signed by the customer requesting the check or by an official of the bank. The amount for which the check is drawn may be stamped on the check and attached copies by the bank. The unit forming the present invention facilitates the handling of the entire banking transaction by the bank as well as by the customer. By virtue of the carbons, the details of the check are accurately reproduced on the attached copies.

One of the copies of the check, after being completed, is retained by the officer of the bank handling the transaction and another copy is handed to the customer. The check is then placed within the envelope, after separation, and mailed in the usual manner by the bank or customer.

With the above and other objects in view, the invention may include the features of construction and operation set forth in the following specification and illustrated in the accompanying drawing.

In the accompanying drawing annexed hereto and forming a part of this specification, I have shown the invention embodied in an envelope unit for specific types of banking transactions but it will be understood that the invention can be otherwise embodied and that the drawing is not to be construed as defining or limiting the scope of the invention, the claims appended to this specification being relied upon for that purpose.

In the drawing:

Fig. 1 is a plan view of a banking envelope and check forming a part of a snap-out assembly made according to the present invention;

Fig. 2 is a plan view of the envelope showing the extended flap or panel to which the check and copies are attached without the snap-out assembly of check and copies attached thereto.

In the above mentioned drawing, there has been shown but one embodiment of the invention which is now deemed preferable, but it is to be understood that changes and modifications may be made within the scope of the appended claims without departing from the spirit of the invention.

Briefly and in its preferred aspect, the invention may include the following principal parts: First, an envelope with a separate panel extending from the edge of the back face and formed integrally with the envelope; second, a snap-out form assembly having its header attached along one side to the extended panel of the envelope, and third, one or more sheets forming parts of said snap-out assembly interleaved with carbon sheets, the outermost sheet comprising a check, draft or other negotiable instrument.

Referring more in detail to the figures of the drawing it will be seen that an envelope 10 formed in the usual manner has an extended panel 12 formed as an integral part of the sheet from which the envelope is made. To facilitate detachment of this extended panel 12 from the envelope proper a line of perforations 14 may be provided positioned as shown so that with the panel 12 detached from the envelope the sealing flap 16 of the envelope may be used to seal the envelope for mailing. As shown, the line of perforations 14 is below the fold line 17. Adjacent one of the free edges of this extended panel 12 is a line of perforations 18. The area of the extended panel 12 within the lines of perforations 14 and 18 is a complete rectangle and, as will be brought out presently, the extended panel 12 constitutes a carbon copy of the material typed or stamped on one or more sheets superposed above the panel.

Attached to one of the free edges of the extended panel 12 beyond the perforations 18 are several sheets 22, 24 and 26, each of which is attached to the sheet above or below it along one edge, the lowermost sheet, a carbon 24, being attached directly to the extended panel 12. The outermost of these sheets 26 in the embodiment of the invention illustrated is in the form of a conventional banking check or draft. This outer sheet or blank check 26 extends to the full outline latterly of the extended panel 12. In addition to its attachment by an adhesive to the interleaved sheets along the edge beyond the perforations 18, there may be provided a small spot of adhesive 28 at the extreme upper left hand corner of the check 26 so that this corner beyond the edges of the interleaved sheets 22 and 24 may be attached directly to the corner of the extended panel 12.

The interleaved sheets 22 and 24 in the form of the invention illustrated comprise sheets of single use carbon paper 24 between which is a sheet 22 slightly longer than the carbon paper sheets 24 but not extending to the edge of the check 26 and extended panel 12. The intermediate sheet 22 disposed between the carbons 24 is perforated in alignment with the perforations 18 for the extended panel 12. By grasping the stub 23 beyond the perforations 18 with the right hand and with the left hand grasping the left hand edge of the check 26 beyond the free edge of the interposed sheet 22, and the carbon sheets 24, the stub 23 and carbon sheets 24 may be severed from the check 26 and the extended panel 12. The intermediate sheet 22 also separated from the stub 23 by this action may be removed and retained by the bank as its memorandum of the transaction. The check 26 may be enclosed within the envelope 10, after separation from the panel 12 at the gummed spot 28 and after completion by the customer or bank official, and mailed. The extended panel 12 of the envelope after being severed from the envelope along perforations 14 will be retained by the customer as his receipt.

If desired after the check 26 has been fully filled out and signed, the intermediate sheet 22 which is not attached at the left hand edge may be withdrawn by severing it along its line of perforations 18 and the remaining parts of the assembly then may be handed by the bank official to the customer. In the meantime and while all parts of the assembly are together, the amount for which the check is drawn may be stamped through all papers.

Fig. 2 shows the envelope 10 prior to the attachment to it of the superposed sheets 22, 24 and 26 which form the snap-out assembly. It will be seen that this surface of the panel 12 is printed with the name of the issuing bank. The number of the check also is duplicated on this panel 12 by the carbon sheet 24 as well as on the interposed sheet 22. This printing through or transferring is true also of the amount for which the check 26 is drawn which is usually done by means of the protectograph. The bank as well as the customer then has all information necessary for their bookkeeping systems in the form of carbon copies of the printed material on the check.

The check 26 when separated from stub 23 along perforations 18 is ready for enclosure within the envelope 10. The interposed sheet 22 if desired may be individually separated from the stub 23 prior to the panel 12 being separated from the envelope 10.

Alternately after severing the panel 12 from the envelope 10, the sheet 22 and check 26 may be separated from the carbons 24 and stub 23 along the perforations 18. Thereafter the check 26 may be separated from the panel 12 at the adhesive spot 28. As shown in Fig. 2 the panel 12 has its stub 23 beyond the perforations 18 cut away at its lower corner. When the stub 23 is removed from the panel therefore the outline of the separated panel is rectangular and of reduced length. The stub 23 formed on this panel 12 will remain attached to the carbon papers 24, when the check 26, interposed sheet 22 and the panel 12 are separated from the stub.

As the panel 12 in the embodiment of the invention illustrated is to be used as a receipt given to the customer by the bank, the words "pay to the order of" appearing on the check 26 should not appear. The space occupied by these words on the check is therefore covered by irregular lines 30 to conceal the words "pay to the order of." In lieu of these words the word "payee" may be printed closely adjacent the lines 30. The lines 30 and the word "payee" may be printed on this sheet or panel when the envelope is being made up and prior to the snap-out assembly being attached.

I claim as my invention:

1. An envelope having a panel extending from one side thereof and a plurality of supperposed sheets of different widths attached to said panel along one side thereof, a sealing flap for said envelope, a line of perforations between the envelope and panel to separate said panel with the superposed sheets thereon from said envelope, lines of perforations along one side of said panel and along one side of some of said sheets whereby said perforated sheets may be separated one from the other, and means on said superposed sheets opposite said lines of perforations to retain said sheets in position on said panel.

2. An envelope having a panel extending from one side thereof, superposed sheets attached to said panel along one side thereof, a sealing flap for said envelope, carbon papers interposed between said sheets and panel and attached along one side of said panel, a line of perforations to separate said panel and superposed sheets and carbons thereon from said envelope, lines of perforations extending along one side of said panel and said sheets, whereby said perforated sheets and panel may be separated from said envelope and from each other.

3. An envelope having a panel extending from the back face thereof, a sealing flap for said envelope extending from the front face thereof, perforations between said panel and the back face of said envelope, the fold line for said sealing flap being beyond said perforations, a check attached along one side of said panel and extending laterally the full width of said panel, sheets of less width than said check and panel interposed between said check and panel, and a line of perforations along the side of said check and interposed sheets along which these members are attached to said panel, whereby said check and sheets may be separated from said panel, and from each other.

4. An envelope having a panel extending from one side thereof, perforations between said panel and the face of said envelope from which said panel extends, a sealing flap for said envelope extending from the face of the envelope opposite that from which said panel extends, an outer sheet attached along one side of said panel, a line of perforations thereon parallel to and adjacent said side, additional attaching means for said sheet at a corner opposite said last mentioned perforations, and interposed sheets between said outer sheet and panel, said interposed sheets being attached to said panel along the same side as said outer sheet but being of less length than said outer sheet.

References Cited in the file of this patent

UNITED STATES PATENTS

| 884,266 | Crump | Apr. 7, 1908 |
| 893,202 | Shaw | July 14, 1908 |
| 2,042,823 | Bonn | June 2, 1936 |
| 2,112,227 | Berkowitz | Mar. 29, 1938 |
| 2,166,439 | Johnson | July 18, 1939 |
| 2,302,992 | Gardner | Nov. 24, 1942 |

FOREIGN PATENTS

| 527,730 | Great Britain | Oct. 15, 1940 |